United States Patent [19]
Kozuka

[11] Patent Number: 5,724,464
[45] Date of Patent: Mar. 3, 1998

[54] COMPOUND OPTICAL WAVEGUIDE DEVICE

[75] Inventor: Yoshinari Kozuka, Nagoya, Japan

[73] Assignee: NGK Insulators, Ltd., Nagoya, Japan

[21] Appl. No.: 316,331

[22] Filed: Sep. 30, 1994

[30] Foreign Application Priority Data

Oct. 1, 1993 [JP] Japan ................. 5-247064

[51] Int. Cl.$^6$ ...................... G02B 6/26; G02B 6/42
[52] U.S. Cl. ...................... 385/31; 385/1; 385/3
[58] Field of Search .................. 385/1, 3, 31, 38, 385/45

[56] References Cited

U.S. PATENT DOCUMENTS

| | | |
|---|---|---|
| 4,981,334 | 1/1991 | Sniadower ........... 385/31 |
| 5,170,448 | 12/1992 | Ackley et al. ........... 385/31 |
| 5,259,044 | 11/1993 | Isono et al. ........... 385/31 |
| 5,291,571 | 3/1994 | Kunikane et al. ........... 385/31 |
| 5,299,222 | 3/1994 | Shannon ........... 385/31 |
| 5,357,103 | 10/1994 | Sasaki ........... 385/31 |
| 5,386,484 | 1/1995 | Ooka et al. ........... 385/13 |
| 5,390,271 | 2/1995 | Priest ........... 385/31 |

FOREIGN PATENT DOCUMENTS

| | | |
|---|---|---|
| 0 452 938 A2 | 10/1991 | European Pat. Off. . |
| 0452938 | 10/1991 | European Pat. Off. . |
| 2 556 480 | 6/1985 | France . |
| 1-118806 A | 5/1989 | Japan . |
| 5157944 | 6/1993 | Japan . |
| WO 90/11491 | 10/1990 | WIPO . |

OTHER PUBLICATIONS

Patent Abstracts of Japan, JP 5-157944, Jun. 25, 1993, "Two-Way Optical Device".
Patent Abstracts of Japan, JP 2-55304, Feb. 23, 1990, "Optical Integrated Circuit".
Jackson et al., SPIE vol. 994 Jan (1988), pp. 40-47, "Optical Fiber Coupling Approaches for Multi-Channel Laser and Detector Arrays".
H. Terui et al., IEEE Photonics Technology Letters, vol. 4, No. 6, Jun., 1992, "Optical Module with a Silica-Based Planar Lightwave Circuit for Fiber-Optic Subscriber Systems".
Paul G. Suchoski, Jr. et al., SPIE vol. 1795, Jan. 1992, pp. 38-47, "Reliability and accelerated aging of LiNbO$_3$ integrated optic fiber gyro circuits".

Primary Examiner—Rodney B. Bovernick
Assistant Examiner—Robert E. Wise
Attorney, Agent, or Firm—Kubovcik & Kubovcik

[57] ABSTRACT

A compound optical waveguide device which is of a reduced size has an optical waveguide chip, a photodiode, and a laser diode. The optical waveguide chip has a substrate of LiNbO$_3$, a Y-shaped optical waveguide, a phase modulator, and a polarizer. The substrate has an end face inclined at 70° with respect to the optical axis of the Y-shaped optical waveguide. A photodiode is fixedly mounted on the substrate. A portion of light propagated through the Y-shaped optical waveguide is reflected by the inclined end face to enter the photodiode. Light emitted from the laser diode enters the Y-shaped optical waveguide through the inclined end face.

11 Claims, 13 Drawing Sheets

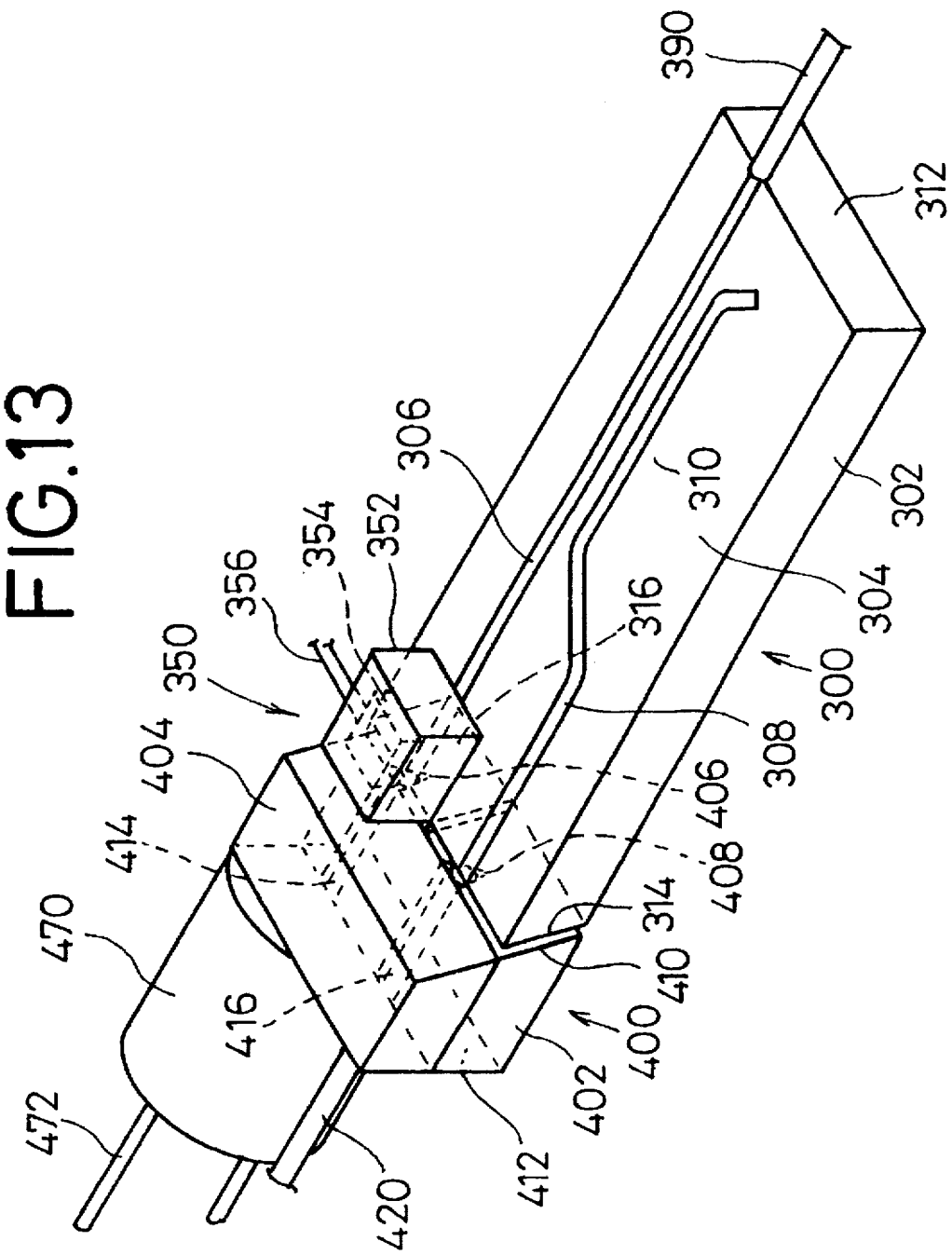

COMPOUND OPTICAL WAVEGUIDE DEVICE

BACKGROUND OF THE INVENTION

1. Field of the Invention

The present invention relates to a compound optical waveguide device, and more particularly to a compound optical waveguide device for use in an optical fiber gyro or an optical transmission system.

2. Description of the Related Art

Optical systems used in conventional optical fiber gyro devices include an optical fiber system composed entirely of optical fibers and an optical system composed of an optical waveguide substrate on which a polarizer and a Y-shaped optical waveguide are disposed.

FIG. 1 of the accompanying drawings shows in perspective a conventional compound optical waveguide device 200 for use in an optical fiber gyro.

As shown in FIG. 1, the compound optical waveguide device 200 generally has an optical waveguide chip 10, an optical fiber loop 90, an optical fiber coupler 606, a laser diode 612 and photodiode 614.

The optical waveguide chip 10 comprises a substrate 12 of $LiNbO_3$, a Y-shaped optical waveguide 16, a phase modulator 24, and a polarizer 28 which are disposed on an upper surface 14 of the substrate 12. The Y-shaped optical waveguide 16 is composed of an optical waveguide 18 and two optical waveguides 20, 22 branched from the optical waveguide 18. The optical fiber coupler 606 is composed of two optical fibers 602, 604 fused to each other, and the optical waveguide 18 has an end connected to the optical fiber 602 of the optical fiber coupler 606. The optical waveguides 20, 22 are connected respectively to optical fibers 92, 94 on the opposite ends of the optical fiber loop 90. The phase modulator 24 comprises a pair of electrodes 26 disposed one on each side of the optical waveguide 20.

The conventional compound optical waveguide device 200 is of a relatively small size as it employs the optical waveguide chip 10 in which the Y-shaped optical waveguide 16, the phase modulator 24, and the polarizer 28 are integrated on the substrate 12. However, the optical coupler 606 cannot be reduced in length as it is composed of the two fused optical fibers 602, 604. Furthermore, the entire compound optical waveguide device 200 is relatively long because the optical waveguide chip 10, the optical coupler 606, the laser diode 612, and the photodiode 614 are arranged in a linear array.

Widespread realization of a subscriber-based system for use in optical-transmission CATV and B-ISDN systems requires that economical and small-size optical components be available for use in an optical transmission system. There have been made research and development efforts for producing optical waveguide devices which allow individual optical components to be reduce in size and cost. There has been proposed a compound or hybrid device having an optical waveguide substrate with an optical waveguide formed thereon, the optical waveguide substrate having light controlling functions, i.e., a function to branch and couple light propagated through the optical waveguide, a function to modulate light propagated through the optical waveguide, and a function to split and combine light propagated through the optical waveguide. The compound device also includes a light-emitting device and a light-detecting device which are combined with the optical waveguide substrate. However, the compound device is disadvantageous because it is large in size and complex in structure.

SUMMARY OF THE INVENTION

It is an object of the present invention to provide a compound optical waveguide device which is small in size.

Another object of the present invention is to provide a compound optical waveguide device which is simple in structure and can be manufactured inexpensively.

According to the present invention, there is provided a compound optical waveguide device comprising an optical waveguide substrate having an optical waveguide and an end face at which an end of the optical waveguide is exposed, the end face being inclined with respect to an optical axis of the optical waveguide for causing a portion of light propagated through the optical waveguide to the end face to be reflected out of the optical waveguide substrate by the end face, a light-detecting device disposed for detecting the light reflected out of the optical waveguide substrate, and light supply means for supplying light to the optical waveguide.

Since the end face of the optical waveguide substrate where the end of the optical waveguide is exposed is inclined to the optical axis of the optical waveguide for causing a portion of light propagated through the optical waveguide to the end face to be reflected out of the optical waveguide substrate by the end face, the compound optical waveguide device may be shorter than a conventional device which employs an optical coupler composed of two optical fibers fused to each other.

The light-detecting device is positioned to detect light reflected from the inclined end face. The light-detecting device is not disposed directly laterally of the optical waveguide substrate, but positioned three-dimensionally above or below the optical waveguide substrate. The overall length of the compound optical waveguide device may thus be reduced. The light-detecting device may easily be mounted on the optical waveguide substrate.

The angle formed between the end face where the end of the optical waveguide is exposed and the optical axis of the optical waveguide should be 80° or less. If the angle were greater than 80°, then the angle of reflection would be too small, and the distance between the end face and the light-detecting device would be too large, so that the optical beam would be spread greatly and the amount of detected light would be too small.

The angle formed between the end face where the end of the optical waveguide is exposed and the optical axis of the optical waveguide should be the Brewster's angle or less because the reflectivity can be increased if the incident angle ranges from the Brewster's angle to the critical angle. The angle of reflection should preferably be in the range of from 40 to 60%.

The angle formed between the end face where the end of the optical waveguide is exposed and the optical axis of the optical waveguide should be; (90°-critical angle) or greater.

The reflectivity may be increased by making light S-polarized while it is being propagated through the optical waveguide. The angle of reflection should preferably be in the range of from 40 to 60%.

The optical waveguide substrate should preferably have at least one of a region for branching and coupling light propagated through the optical waveguide, a region for modulating light propagated through the optical waveguide, a region for splitting and combining light propagated through the optical waveguide, and a region for isolating light propagated through the optical waveguide. If necessary, the optical waveguide substrate may have two or more of these regions for a higher degree of integration.

The optical waveguide substrate may have a film made of dielectric or metal and disposed on the end face, whereby the portion of light propagated through the optical waveguide to the end face can be reflected out of the optical waveguide substrate by at least one of an interface between the film and the end face and a surface of the film opposite to a surface thereof which is held in contact with the end face. The reflectivity can be increased by such an arrangement. The preferable angle of reflection is in the range of from 40 to 60%.

Preferably, the light from the light supply means is supplied to the optical waveguide through the end face. The light supply means may comprise a light-emitting device module composed of a light-emitting device and a lens, and the light-emitting device module may be connected directly to the end face. Such an arrangement is effective in reducing the size of the compound optical waveguide device. However, since the light-emitting device module is of a large volume, it may be difficult to connect the light-emitting device module directly to the end face. In such a case, light from the light-emitting device may be introduced through an optical fiber and the end face into the optical waveguide.

Preferably, the optical waveguide substrate comprises a substrate of $LiNbO_3$, a substrate of $LiTaO_3$, a substrate of glass, or a substrate of semiconductor.

According to the present invention, there is also provided a compound optical waveguide device for use in an optical fiber gyro, comprising an optical waveguide substrate having a Y-shaped optical waveguide composed of a first optical waveguide and a pair of second and third optical waveguides branched from the first optical waveguide, a first end face at which an end of the first optical waveguide is exposed, a second end face at which ends of the second and third optical waveguides are exposed, the second end face being adapted to be connected to an optical fiber loop, and a phase modulator for modulating the phase of light propagated through at least one of the second and third optical waveguides, the first end face being inclined with respect to an optical axis of the first optical waveguide for causing a portion of light propagated through the first optical waveguide to the first end face to be reflected out of the optical waveguide substrate by the first end face, a light-detecting device disposed for detecting the light reflected out of the optical waveguide substrate, and light supply means for supplying light to the Y-shaped optical waveguide.

Inasmuch as the first end face of the optical waveguide substrate where the end of the first optical waveguide is exposed is inclined to the optical axis of the first optical waveguide for causing a portion of light propagated through the first optical waveguide to the first end face to be reflected out of the optical waveguide substrate by the first end face, the compound optical waveguide device for an optical fiber gyro may be shorter than a conventional device which employs an optical coupler composed of two optical fibers fused to each other.

The light-detecting device is positioned to detect light reflected from the inclined first end face. The light-detecting device is not disposed directly laterally of the optical waveguide substrate, but positioned three-dimensionally above or below the optical waveguide substrate. The overall length of the compound optical waveguide device for an optical fiber gyro may thus be reduced.

According to the present invention, there is further provided a bidirectional wavelength multiplexing transmission module comprising an optical waveguide substrate having a first optical waveguide, a second optical waveguide, an end face at which an end of the first optical waveguide is exposed, and a directional-coupler-type combiner/splitter for splitting and combining light propagated through the first optical waveguide and light propagated through the second optical waveguide, the end face being inclined with respect to an optical axis of the first optical waveguide for causing a portion of light propagated through the first optical waveguide to the end face to be reflected out of the optical waveguide substrate by the end face, a light-detecting device disposed for detecting the light reflected out of the optical waveguide substrate, light supply means for supplying light having a first wavelength to the first optical waveguide, and means for passing light having a second wavelength different from the first wavelength through the second optical waveguide.

Because the end face of the optical waveguide substrate where the end of the first optical waveguide is exposed is inclined to the optical axis of the first optical waveguide for causing a portion of light propagated through the first optical waveguide to the end face to be reflected out of the optical waveguide substrate by the end face, the bidirectional wavelength multiplexing transmission module may be of a short length.

Since the light-detecting device is positioned to detect light reflected from the inclined end face, the light-detecting device is not disposed directly laterally of the optical waveguide substrate, but positioned three-dimensionally above or below the optical waveguide substrate. The overall length of the bidirectional wavelength multiplexing transmission module may thus be reduced.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 is a perspective view of a bidirectional wavelength multiplexing transmission module according to a fifth embodiment of the present invention.

DETAILED DESCRIPTION OF THE PREFERRED EMBODIMENTS

Figure 1:
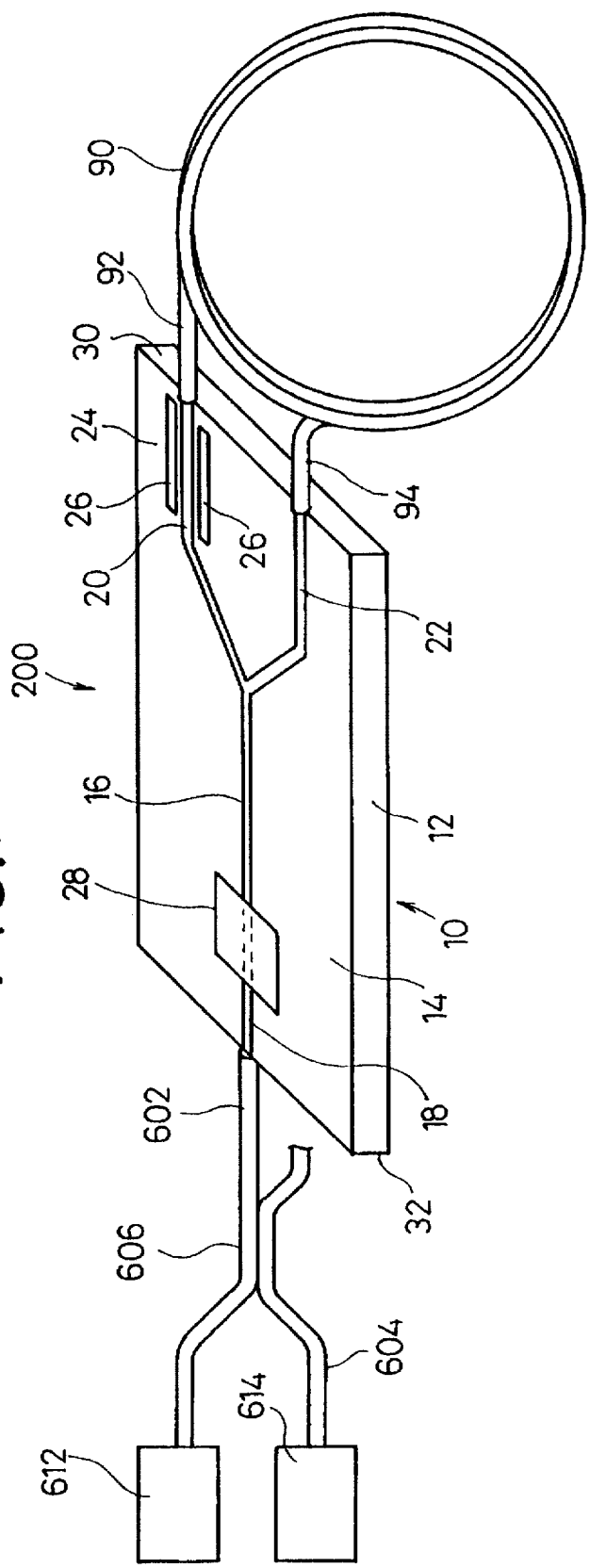
FIG. 1 is a perspective view of a conventional compound optical waveguide device for use in an optical fiber gyro.
Figure 2:
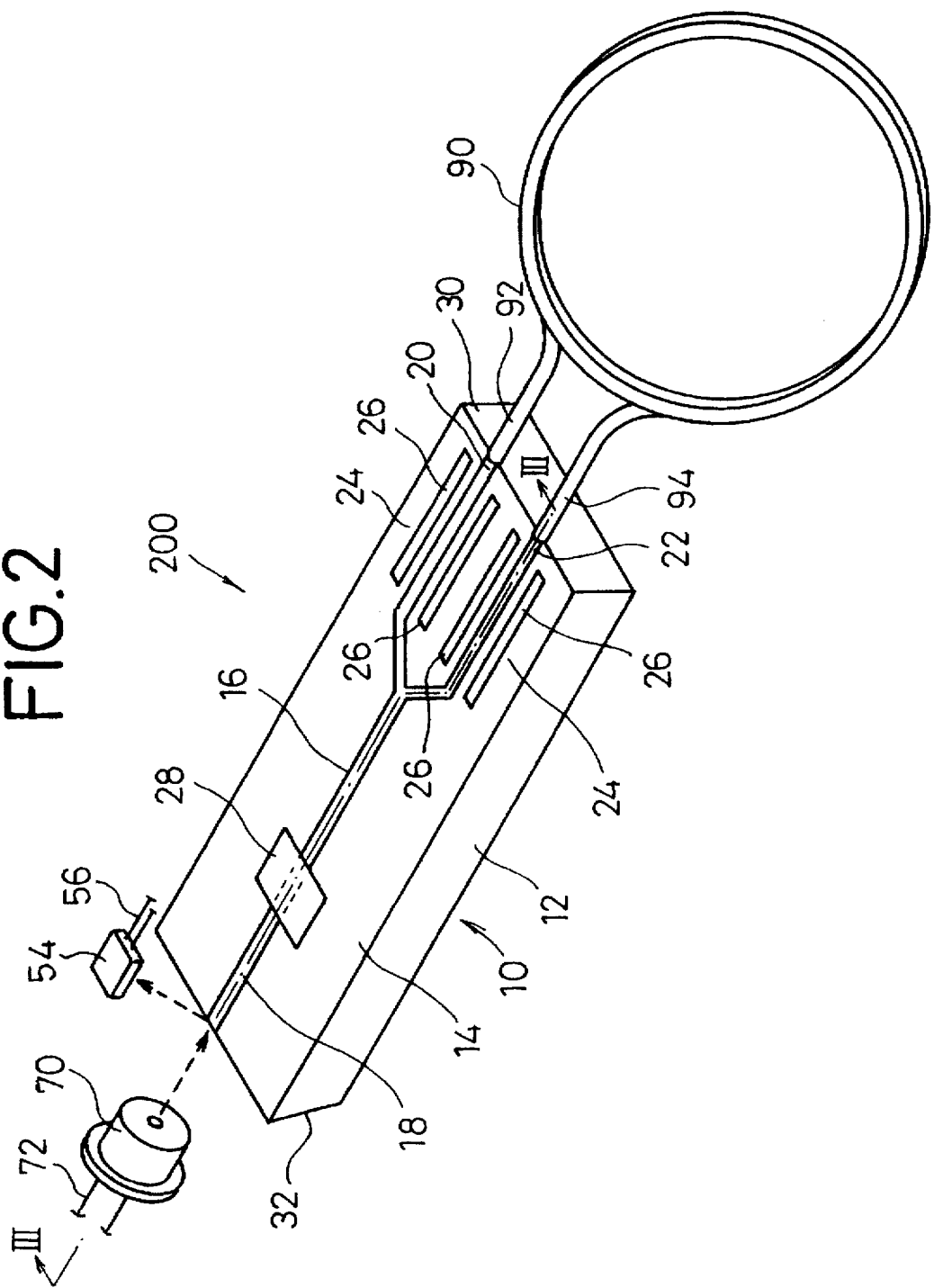
FIG. 2 is a perspective view of a compound optical waveguide device for use in an optical fiber gyro according to a first embodiment of the present invention.
Figure 3:
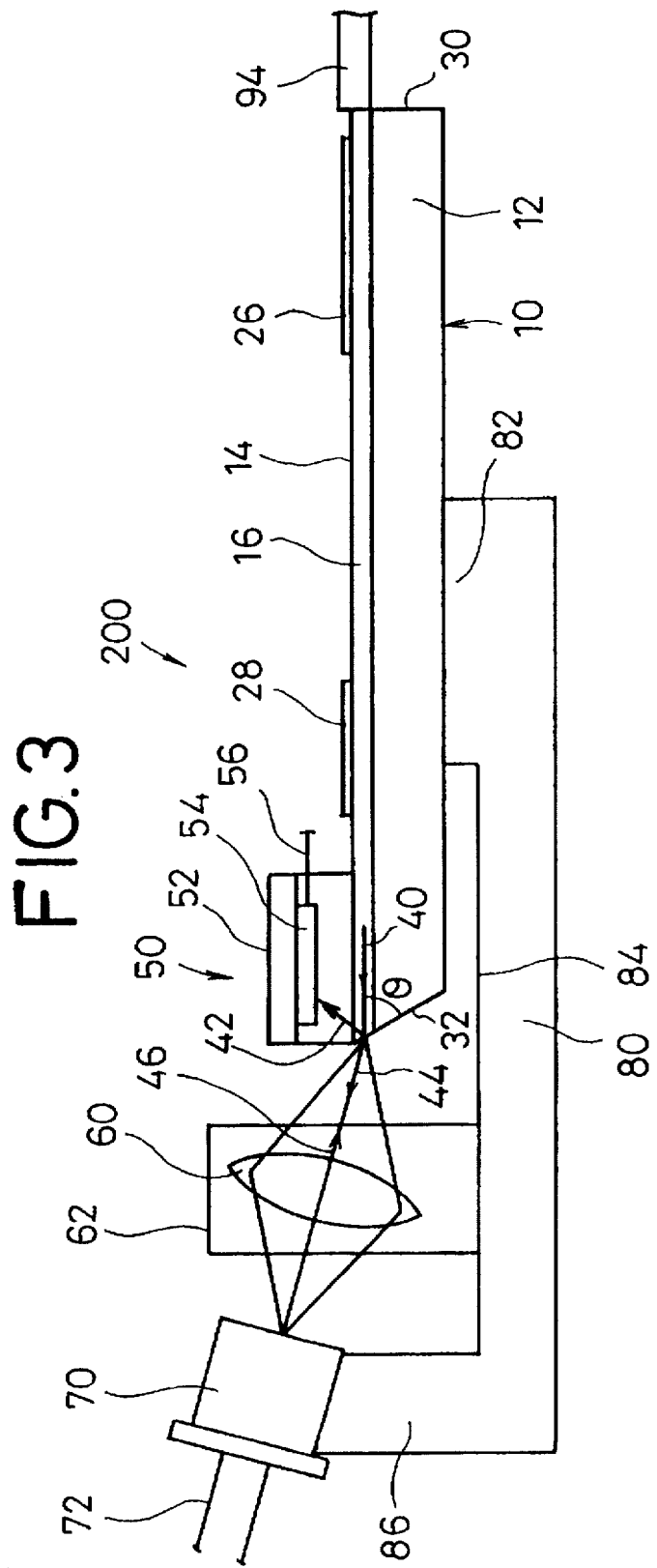
FIG. 3 is a cross-sectional view taken along line III—III of FIG. 2.

As shown in FIGS. 2 and 3, a compound optical waveguide device 200 for use in an optical fiber gyro according to a first embodiment of the present invention generally includes an optical waveguide chip 10, an optical fiber loop 90, a photodiode 54, and a laser diode 70.

The optical waveguide chip 10 comprises a substrate 12 of $LiNbO_3$, a Y-shaped optical waveguide 16, a pair of phase modulators 24, and a polarizer 28 which are disposed on an upper surface 14 of the substrate 12. The Y-shaped optical waveguide 16 is composed of an optical waveguide 18 and two optical waveguides 20, 22 branched from the optical waveguide 18. The optical waveguides 20, 22 have ends connected respectively to optical fibers 92, 94 on the opposite ends of the optical fiber loop 90 at an end face 30 of the substrate 12. One of the phase modulators 24 comprises a pair of electrodes 26 disposed one on each side of the optical waveguide 20. The other phase modulator 24 also comprises a pair of electrodes 26 disposed one on each side of the optical waveguide 22. The polarizer 28 is disposed over the optical waveguide 18.

The substrate 12 has an opposite end face 32 where one end of the Y-shaped optical waveguide 16 is exposed. The end face 32 is polished to an optical finish such that it is inclined at $\theta=70°$ to the optical axis of the Y-shaped optical waveguide 16. In this embodiment, the end face 32 is also inclined at $\theta=70°$ to the upper surface 14 of the substrate 12. A portion of light 40 propagated through the Y-shaped optical waveguide 16 to the end face 32 is reflected as reflected light 42 by the end face 32, and a portion of the propagated light 40 is refracted as propagated light 44 by the end face 32.

A photodiode module 50 is fixedly mounted on the upper surface 14 of the substrate 12 near the end face 32 of the substrate 12. The photodiode module 50 comprises a photodiode holder 52 and a photodiode 54 mounted on the photodiode holder 52. The photodiode 54 is positioned directly over the Y-shaped optical waveguide 16 such that the reflected light 54 from the end face 32 will enter the photodiode 54. Leads 56 extend from the photodiode 54.

As shown in FIG. 3, the optical waveguide chip 10 is mounted on a rear ledge 82 of a device support base 80. The device support base 80 has a front ledge 86 with a laser diode 70 mounted thereon. Light, i.e., a laser beam, emitted from the laser diode 70 is converged by a lens 60 into incident light 46 which enters the Y-shaped optical waveguide 16 through the end face 32 of the substrate 12. The lens 60 is supported by a lens holder 62 which is disposed in a central recess 84 defined in the device support base 80. Leads 72 extend from the laser diode 70.

A process of fabricating the compound optical waveguide device 200 according to the first embodiment of the present invention will be described below.

A titanium (Ti) film having a width of 3 μm and a thickness of 500 Å is selectively formed by photolithography on a single crystal wafer (not shown) of $LiNbO_3$ having an electrooptical effect, the single crystal wafer having a diameter of 3 inches and a thickness of 1 mm. Thereafter, the single crystal wafer is heated at 1000° C. for 6 hours, allowing Ti to be diffused therein, so that a Ti-diffused Y-shaped optical waveguide 16 is selectively formed. The single crystal wafer may be made of $LiTaO_3$, glass, or a semiconductor.

Then, a thin aluminum (Al) film is evaporated on the optical waveguide 18 of the Y-shaped optical waveguide 16, using a silicon dioxide ($SiO_2$) film as a buffer, and unnecessary portions of the Al film are removed, thereby forming a polarizer 28. Electrodes 26 in the form of thin gold (Au) films are selectively formed on opposite sides of the optical waveguides 20, 22 parallel thereto, thereby forming phase modulators 24.

Then, a plurality of substrates 12 of $LiNbO_3$ each having a width of 5 mm and a length of 40 mm are cut out of the single crystal wafer of $LiNbO_3$. The end face 32 of each of the substrates 12 is polished to an optical finish such that it is inclined at 70° to the upper surface 14 of the substrate 12.

Thereafter, a photodiode module 50 is fixedly mounted on the upper surface 14 of the substrate 12 in the vicinity of the end face 32. A laser diode 70 for emitting light having a wavelength of 0.85 μm is mounted on the front ledge 86 of the device support base 80 such that a laser beam emitted from the laser diode 70 will be converged by the lens 60 onto the end of the Y-shaped optical waveguide 16 which is exposed on the end face 32.

Then, the optical fibers 92, 94 on the opposite ends of the optical fiber loop 90 are connected respectively to the ends of the optical waveguides 20, 22 at the end face 30 of the substrate 12, thereby completing a compound optical waveguide device 200.

Figure 4:
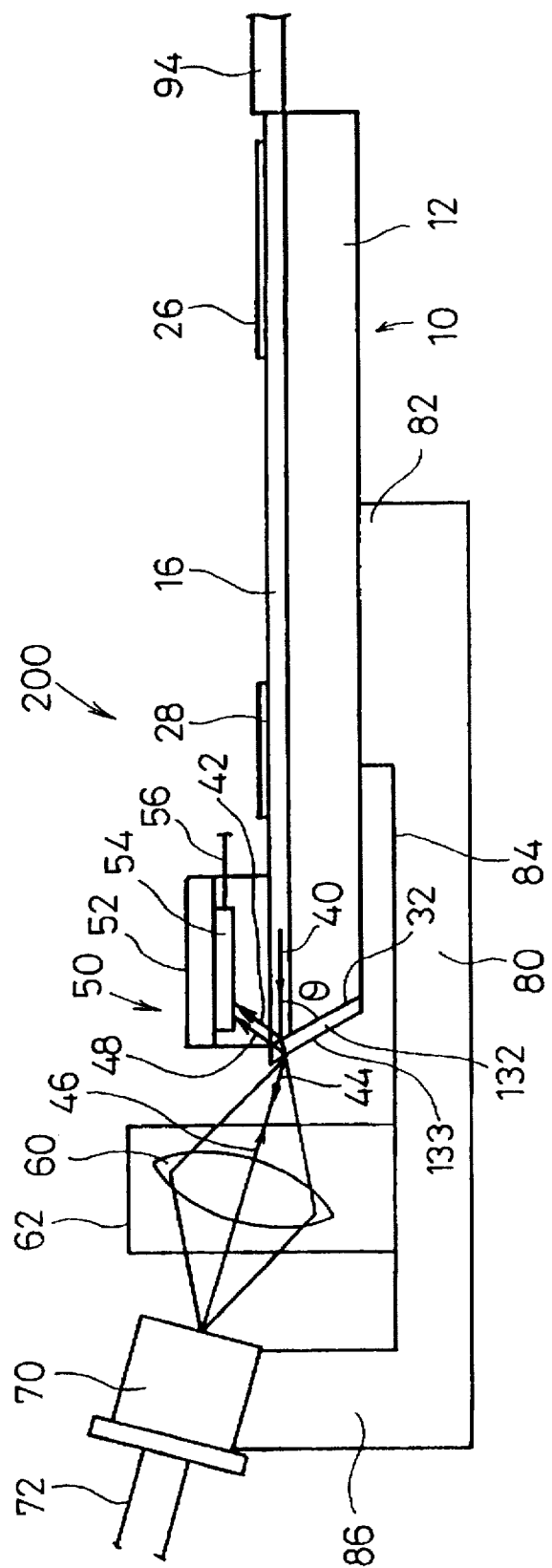
FIG. 4 is a cross-sectional view of a modification of the compound optical waveguide device according to the first embodiment of the present invention.

FIG. 4 shows in cross section a modification of the compound optical waveguide device 200 according to the first embodiment of the present invention.

The modified compound optical waveguide device 200 shown in FIG. 4 differs from the compound optical waveguide device 200 according to the first embodiment in that a thin Ti film 132 is disposed on the end face 32 of the substrate 12. The other details of the modified compound optical waveguide device 200 are the same as those of the compound optical waveguide device 200 according to the first embodiment. The modified compound optical waveguide device 200 is fabricated in the same manner as the compound optical waveguide device 200 according to the first embodiment. In this modification, a portion of light 40 propagated through the Y-shaped optical waveguide 16 to the end face 32 is reflected by the end face 32 and a surface 133 of the thin Ti film 132 into reflected light 42 and reflected light 48, respectively, which enter the photodiode 54. The thin Ti film 132 is effective in increasing the reflectivity for the reflected light 42.

Figure 5:
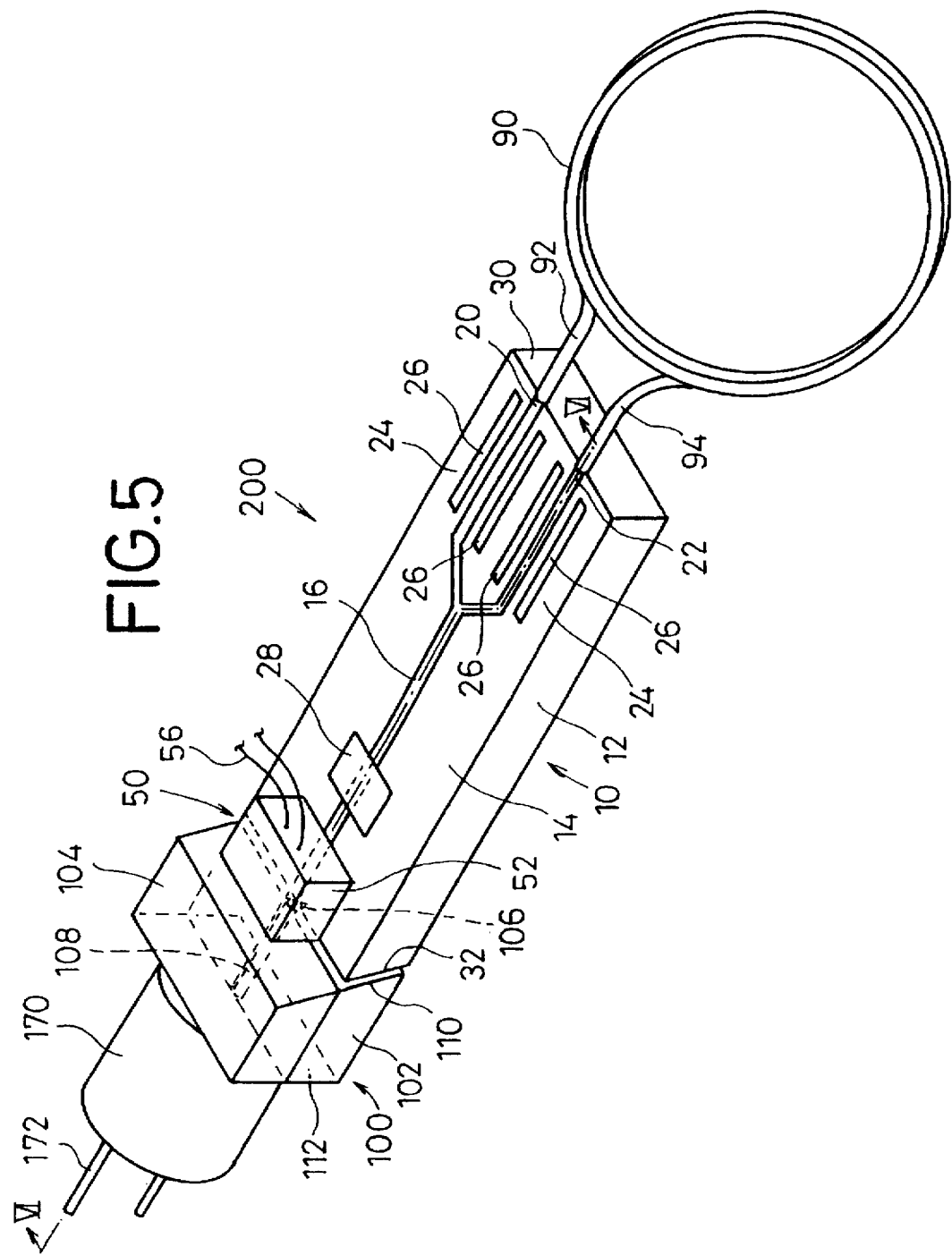
FIG. 5 is a perspective view of a compound optical waveguide device for use in an optical fiber gyro according to a second embodiment of the present invention.
Figure 6:
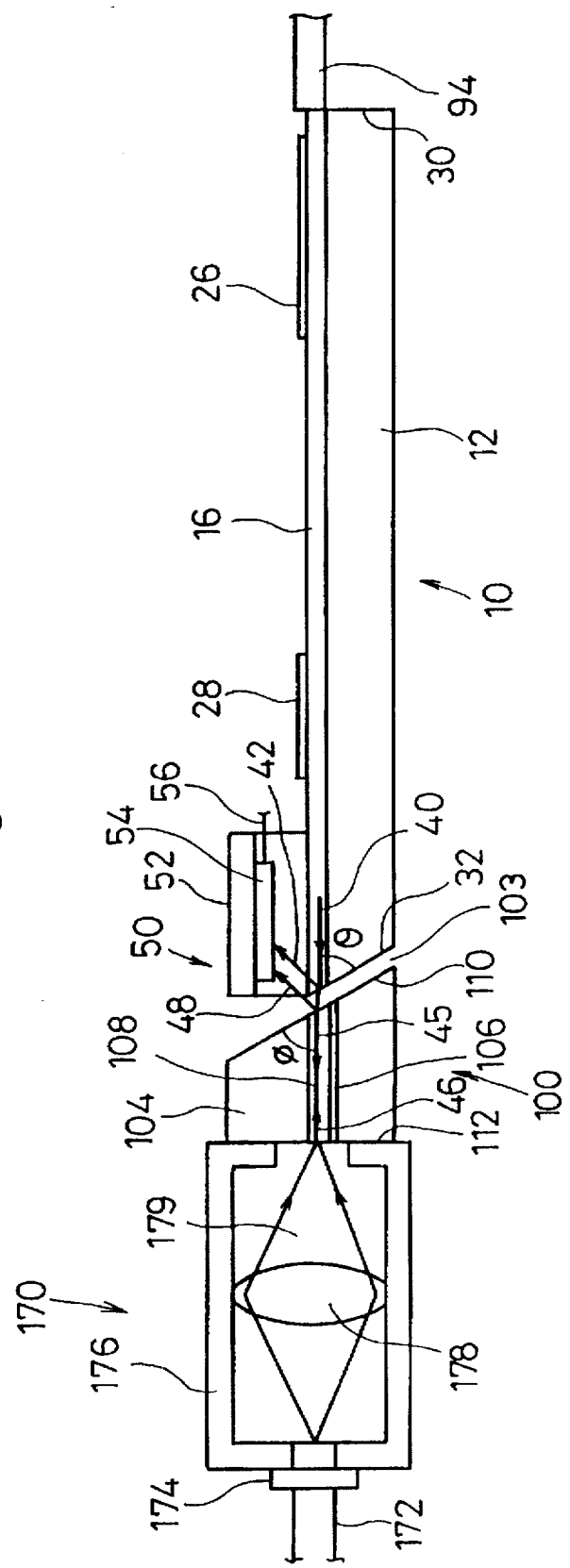
FIG. 6 is a cross-sectional view taken along line VI—VI of FIG. 5.

FIGS. 5 and 6 show a compound optical waveguide device 200 for use in an optical fiber gyro according to a second embodiment of the present invention.

In the first embodiment, light emitted from the laser diode 70 is converged by the lens 60 so as to directly enter the Y-shaped optical waveguide 16 at the end face 32 of the substrate 12. In the second embodiment, however, a laser beam 179 emitted from a laser diode 174 of a laser diode module 170 travels through an optical fiber-embedded waveguide chip 100 and then enters the Y-shaped optical waveguide 16 which is exposed on the end face 32 of the substrate 12. The other details of the compound optical waveguide device 200 according to the second embodiment are the same as those of the compound optical waveguide device 200 according to the first embodiment.

The laser diode module 170 comprises a holder 176, the laser diode 174, and a lens 178 for converging the laser beam 179 emitted from the laser diode 174. The laser diode 174 and the lens 178 are fixedly mounted in a holder 176. Leads 172 extend from the laser diode 174.

The optical fiber-embedded waveguide chip 100 comprises a ceramic substrate 102, a quartz cover 104 mounted on the ceramic substrate 102, and a bare optical fiber 108. The ceramic substrate 102 has a V groove 106 having a V-shaped cross section defined in an upper surface thereof. The bare optical fiber 108 with a covering removed therefrom is fixedly placed in the V groove 106 by the ceramic substrate 102 and the quartz cover 104. The optical fiber-embedded waveguide chip 100 has an end face 112 polished to an optical finish such that it lies at 90° with respect to the optical axis of the bare optical fiber 108. The laser diode module 170 is attached to the end face 112 such that the laser beam 179 emitted from the laser diode 174 will be converged onto the end of the bare optical fiber 108 which is exposed on the end face 112 and will travel as propagated light 45 through the bare optical fiber 108.

The optical fiber-embedded waveguide chip 100 has an opposite end face 110 polished to an optical finish such that it is inclined at $\phi=70°$ with respect to the optical axis of the bare optical fiber 108. The end face 110 of the optical fiber-embedded waveguide chip 100 and the end face 32 of the optical waveguide chip 10 extend substantially parallel to each other and are spaced from each other with an air layer 103 interposed therebetween. With such an arrangement, the bare optical fiber 108 and the Y-shaped optical waveguide 16 are optically coupled to each other. A portion of the propagated light 40 which is propagated through the Y-shaped optical waveguide 16 to the end face 32 is reflected by the end faces 32, 110 into reflected light 42 and reflected light 48, respectively, which enter the photodiode 54. A portion of the propagated light 40 is refracted by the end faces 32, 110 into propagated light 45 which is then propagated through the bare optical fiber 108 to the end face 112.

A process of fabricating the compound optical waveguide device 200 according to the second embodiment of the present invention will be described below.

A V groove 106 is defined in the upper surface of a ceramic substrate 102 having a length of 5 mm, a width of 5 mm, and a thickness of 3 mm, and a bare optical fiber 108 which is about 5 mm long is placed in the V groove 106. Then, a quartz cover 104 having a thickness of 2 mm is put on the bare optical fiber 108. The ceramic substrate 102, the bare optical fiber 108, and the quartz cover 104 are fixed together by a resin adhesive, thus completing an optical fiber-embedded waveguide chip 100.

Then, an end face 110 of the optical fiber-embedded waveguide chip 100 is polished to an optical finish such that it is inclined at $\phi=70°$ with respect to the optical axis of the bare optical fiber 108, and an end face 112 thereof is polished to an optical finish such that it lies at 90° with respect to the optical axis of the bare optical fiber 108. The laser diode module 170 is thereafter mounted on the end face 112 such that the laser beam 179 emitted from the laser diode 174 is converged onto the end of the bare optical fiber 108 which is exposed on the end face 112.

The optical waveguide chip 10 is then fabricated in the same manner as with the first embodiment, and the photodiode module 50 is fixedly mounted on the upper surface 14 of the optical waveguide chip 10.

The fiber-embedded waveguide chip 100 and the optical waveguide chip 10 are positioned and fixed with respect to each other such that the end faces 110, 32 extend substantially parallel to each other, and the optical axis of the bare optical fiber 108 and the optical axis of the Y-shaped optical waveguide 16 are aligned with each other.

Then, the optical fibers 92, 94 on the opposite ends of the optical fiber loop 90 are connected respectively to the ends of the optical waveguides 20, 22 at the end face 30 of the substrate 12, thereby completing a compound optical waveguide device 200.

Figure 7:
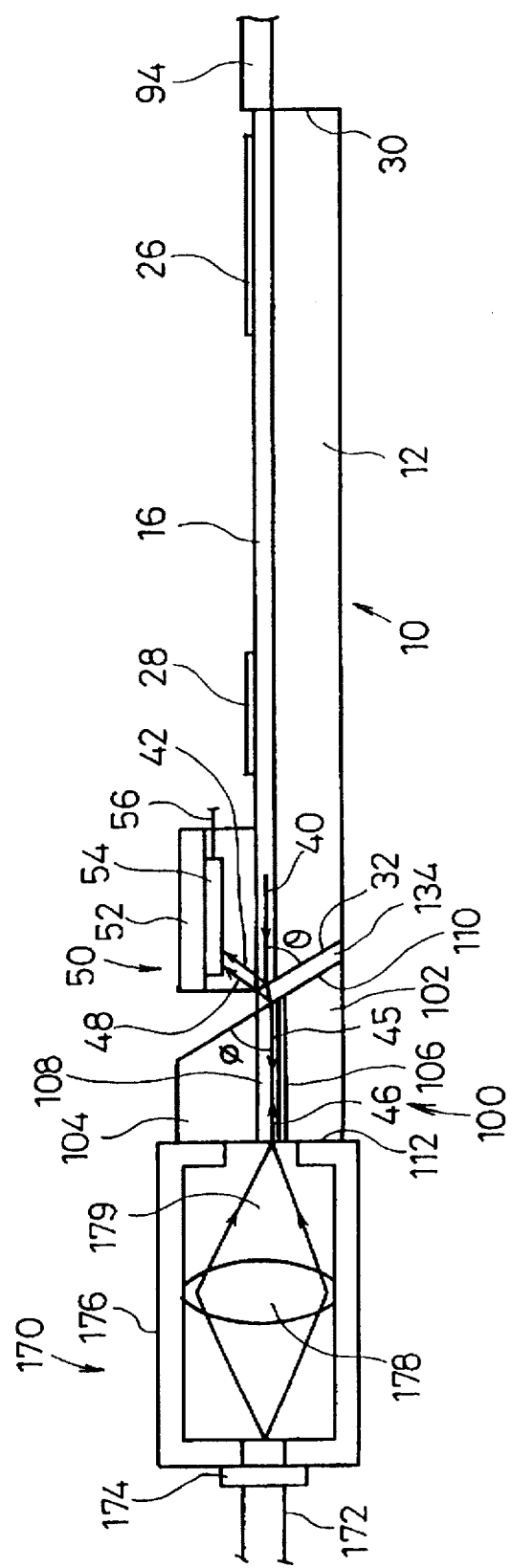
FIG. 7 is a cross-sectional view of a modification of the compound optical waveguide device according to the second embodiment of the present invention.

FIG. 7 shows in cross section a modification of the compound optical waveguide device 200 according to the second embodiment of the present invention.

The modified compound optical waveguide device shown in FIG. 7 differs from the compound optical waveguide device 200 according to the second embodiment in that a thin Ti film 134 is disposed on the end face 32 of the substrate 32 and inserted between the end faces 110, 32. The other details of the modified compound optical waveguide device are the same as those of the compound optical waveguide device 200 according to the second embodiment. The modified compound optical waveguide device is fabricated in the same manner as the compound optical waveguide device 200 according to the second embodiment.

In the modification shown in FIG. 7, a portion of light 40 propagated through the Y-shaped optical waveguide 16 to the end face 32 is reflected by the end faces 32, 110 into reflected light 42 and reflected light 48, respectively, which enter the photodiode 54. The thin Ti film 134 is effective in increasing the reflectivity for the reflected light 42 and easily setting the reflectivity to a desired value.

Figure 8:
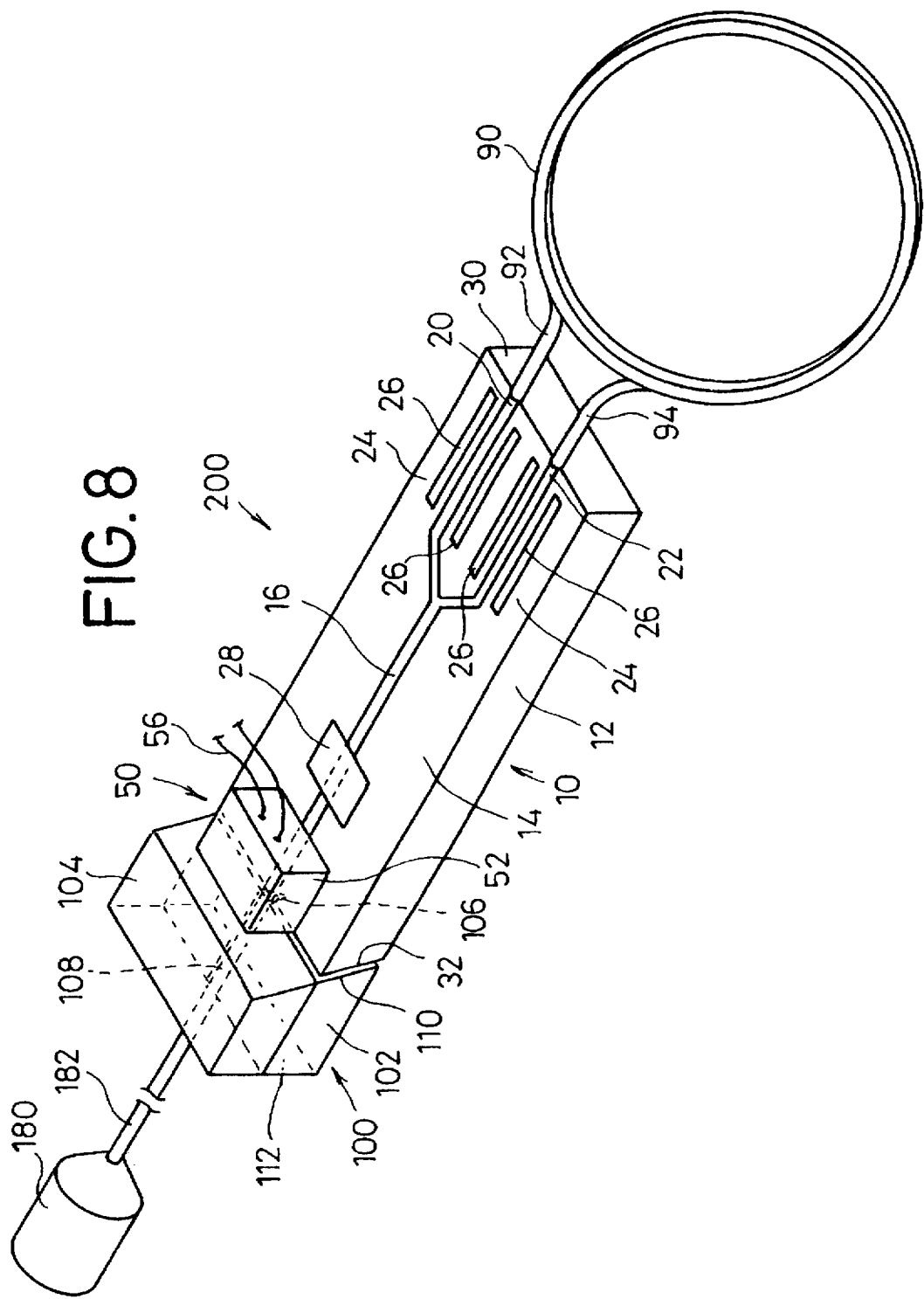
FIG. 8 is a perspective view of a compound optical waveguide device for use in an optical fiber gyro according to a third embodiment of the present invention.

FIG. 8 illustrates a compound optical waveguide device 200 for use in an optical fiber gyro according to a third embodiment of the present invention.

In the second embodiment above, the laser diode module 170 is mounted on the end face 112 of the fiber-embedded waveguide chip 100. In the third embodiment, however, an optical fiber 182 is inserted between a laser diode module 180 and the end face 112 of the fiber-embedded waveguide chip 100. The other details of the compound optical waveguide device 200 according to the third embodiment are the same as those of the compound optical waveguide device 200 according to the second embodiment. The compound optical waveguide device 200 according to the third embodiment is fabricated in the same manner as the compound optical waveguide device 200 according to the second embodiment.

Figure 9:
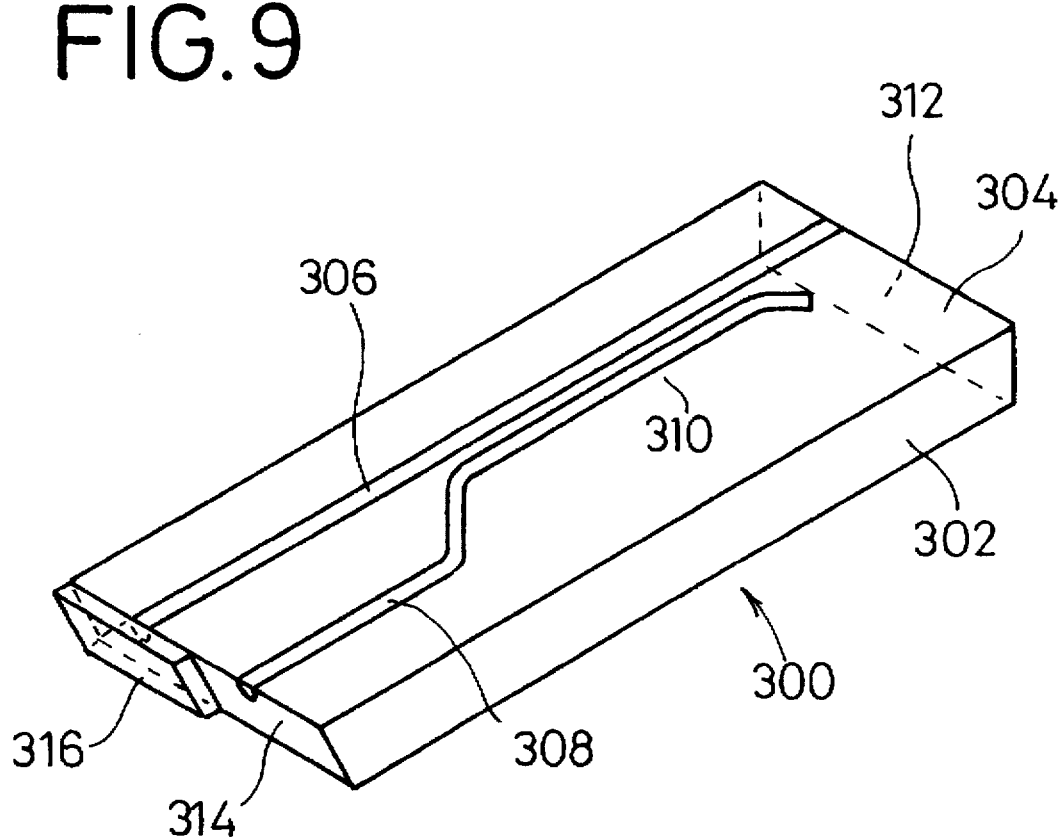
FIG. 9 is a perspective view of an optical waveguide substrate of quartz in a bidirectional wavelength multiplexing transmission module according to a fourth embodiment of the present invention.
Figure 10:
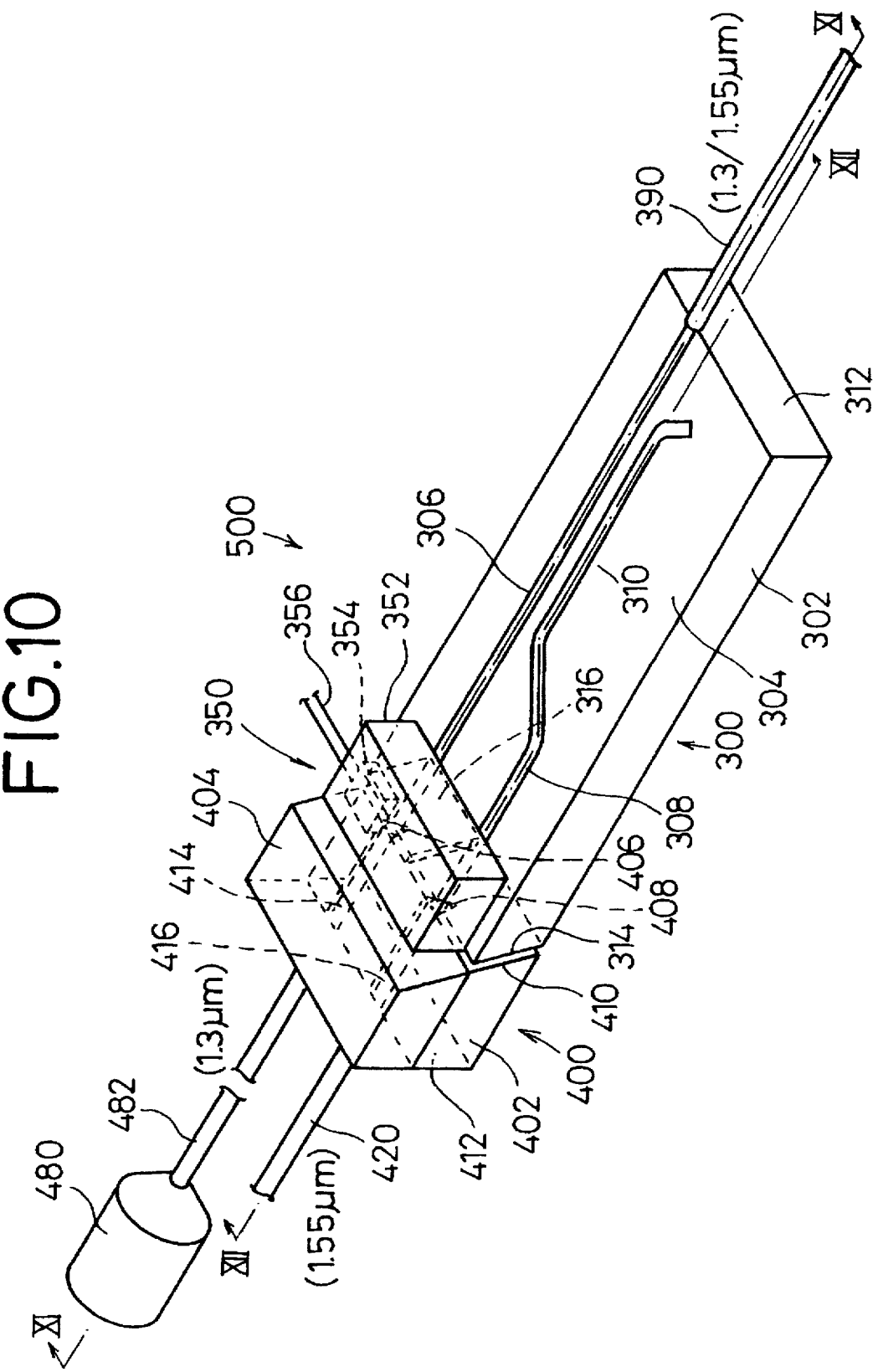
FIG. 10 is a perspective view of the bidirectional wavelength multiplexing transmission module according to the fourth embodiment of the present invention.
Figure 11:
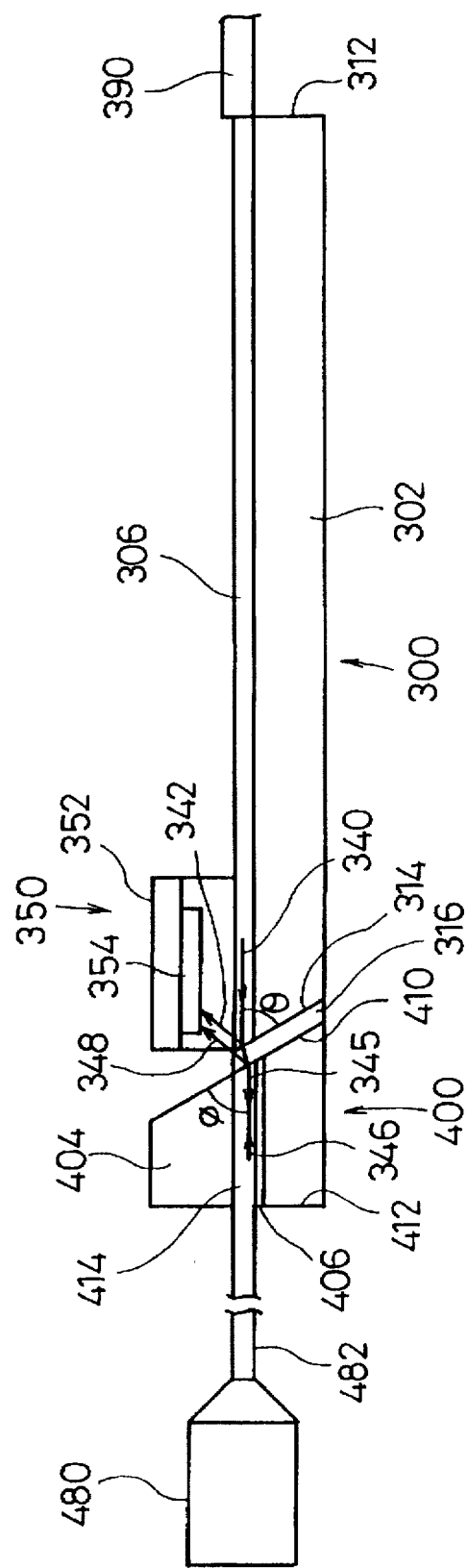
FIG. 11 is a cross-sectional view taken along line XI—XI of FIG. 10.
Figure 12:
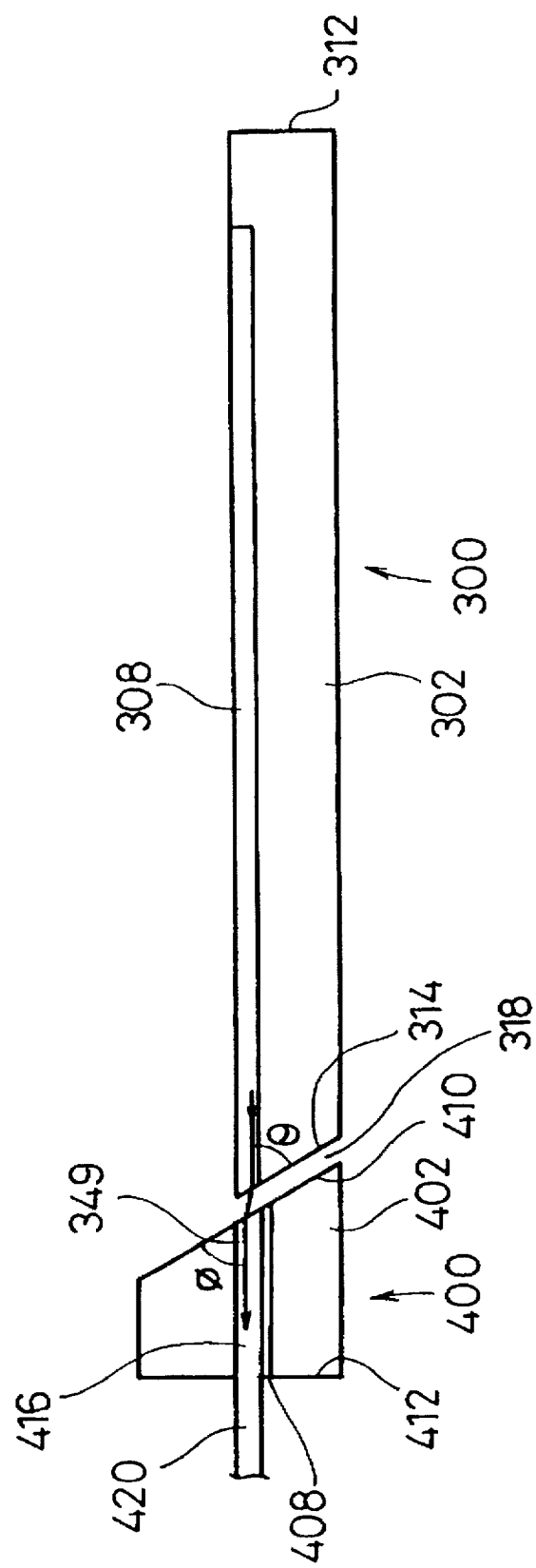
FIG. 12 is a cross-sectional view taken along line XII—XII of FIG. 10.

FIG. 9 shows an optical waveguide substrate of quartz in a bidirectional wavelength multiplexing transmission module according to a fourth embodiment of the present invention. FIGS. 10 through 12 show the bidirectional wavelength multiplexing transmission module according to the fourth embodiment of the present invention.

The bidirectional wavelength multiplexing transmission module, generally designated by the reference numeral 500, comprises an optical waveguide substrate 300 of quartz, a photodiode module 350, an optical fiber-embedded waveguide chip 400, a laser diode module 480, and optical fibers 390, 420, 482.

The optical fiber-embedded waveguide chip 400 comprises a ceramic substrate 402, a quartz cover 404 mounted on the ceramic substrate 402, and a pair of bare optical fibers 414, 416. The ceramic substrate 402 has a pair of V grooves 406, 408 each having a V-shaped cross section defined in an upper surface thereof. The bare optical fibers 414, 416 with a covering removed therefrom are fixedly placed in the V grooves 406, 408, respectively, by the ceramic substrate 402 and the quartz cover 404.

The optical fiber-embedded waveguide chip 400 has an end face 412 polished to an optical finish such that it lies at 90° with respect to the optical axes of the bare optical fibers 414, 416. The laser diode module 480, which emits a laser beam having a wavelength of 1.3 μm, is attached to one end of the optical fiber 482 whose other end is connected to the end face 412 such that it is optically coupled to the bare optical fiber 414 which is exposed on the end face 412. The optical fiber 420, which transmits light having a wavelength of 1.55 μm, has an end connected to the end face 412 such that it is optically coupled to the bare optical fiber 416 which is exposed on the end face 412. The optical fiber-embedded waveguide chip 400 has an end face 410 which is polished to an optical finish such that it is inclined at $\phi=60°$ with respect to the optical axes of the bare optical fibers 414, 416.

The optical waveguide substrate 300 of quartz comprises a quartz substrate 302, optical waveguides 306, 308 of quartz disposed on an upper surface 304 of the quartz substrate 302, and a thin Ti film 316 disposed on a portion of an end face 314 of the quartz substrate 302. The optical waveguides 306, 308 are positioned closely to each other, thus forming a directional-coupler-type combiner/splitter 310. The optical waveguide 306 has opposite ends exposed respectively on end faces 312, 314 of the quartz substrate 302. The optical waveguide 308 has an end exposed on the end face 314 of the quartz substrate 302 and an opposite end terminating in the quartz substrate 302.

The end face 314 of the quartz substrate 302 where the ends of the optical waveguides 306, 308 are exposed is cut and polished to an optical finish such that it is inclined at $\theta=60°$ with respect to the optical axes of the optical waveguides 306, 308. In this embodiment, the end face 314 is inclined at $\theta=60°$ with respect to the upper surface 304 of the quartz substrate 302. The end face 312 of the quartz substrate 302 where the other end of the optical waveguide 306 is exposed is polished to an optical finish such that it lies at 90° with respect to the optical axis of the optical waveguide 306. The end of the optical waveguide 306 is connected to the optical fiber 390 at the end face 312 of the quartz substrate 302.

The photodiode module 350 is fixedly mounted on the upper surface 304 of the quartz substrate 302 near the end face 314 of the quartz substrate 302. The photodiode module 350 comprises a photodiode holder 352 and a photodiode 354 mounted on the photodiode holder 352. The photodiode 354 is positioned directly over the quartz waveguide 306. Leads 356 extend from the photodiode 354.

The end face 410 of the optical fiber-embedded waveguide chip 400 and the end face 314 of the optical waveguide substrate 300 of quartz extend substantially parallel to each other and are spaced from each other with the thin Ti film 316 and an air layer 318 partially interposed therebetween. The thin Ti film 316 is inserted between the bare optical fiber 414, which transmits light having a wavelength of 1.3 μm, and the optical waveguide 306. The air layer 318 is inserted between the bare optical fiber 416, which transmits light having a wavelength of 1.55 μm, and the optical waveguide 308.

With such an arrangement, the bare optical fiber 414 and the optical waveguide 306 are optically coupled to each other. Incident light 346 propagated through the bare optical fiber 414 to the end face 410 is refracted by the end faces 410, 314 so as to enter the optical waveguide 306, and a portion of propagated light 340 which is propagated through the optical waveguide 306 to the end face 314 is reflected by the end faces 314, 410 into reflected light 342 and reflected light 348, respectively, which enter the photodiode 354. A portion of the propagated light 340 is refracted by the end faces 314, 410 into propagated light 345 which is then propagated through the bare optical fiber 414 to the end face 412.

Furthermore, the bare optical fiber 416 and the optical waveguide 308 are optically coupled to each other, and light 349 which travels through the directional-coupler-type combiner/splitter 310 and is propagated through the optical waveguide 308 to the end face 314 is refracted by the end faces 314, 410 and enters the bare optical fiber 416.

A process of fabricating the bidirectional wavelength multiplexing transmission module 500 will be described below.

Optical waveguides 306, 308 of quartz are formed on the upper surface 304 of a quartz substrate 302, the optical waveguides 306, 308 jointly constituting a directional-coupler-type combiner/splitter 310 for combining and splitting light having a wavelength of 1.3 μm and light having a wavelength of 1.55 μm.

Then, an end face 314 of the quartz substrate 302 is polished to an optical finish such that it is inclined at $\theta=60°$ with respect to the optical axes of the optical waveguides 306, 308. A thin Ti film 316 is selectively evaporated on the end face 314 where the optical waveguide 306 is exposed, thus producing an end face 314 having a reflectivity of 50%. An end face 312 of the quartz substrate 302 is polished to an optical finish such that it lies at 90° with respect to the optical axis of the optical waveguide 306.

Then, the photodiode module 350 is fixedly mounted on the upper surface 304 of the quartz substrate 302 in the vicinity of the end face 314 of the quartz substrate 302.

V grooves 406, 408 are defined in the upper surface of a ceramic substrate 402, and the bare optical fibers 414, 416 are disposed respectively in the V grooves 406, 308. The quartz cover 404 is placed on the bare optical fibers 414, 416, and the ceramic substrate 402, the bare optical fibers 414, 416, and the quartz cover 404 are fixed together by a resin adhesive, thus completing an optical fiber-embedded waveguide chip 400.

Then, an end face 410 of the optical fiber-embedded waveguide chip 400 is polished to an optical finish such that it is inclined at $\phi=60°$ with respect to the optical axes of the bare optical fibers 414, 416, and an end face 412 thereof is polished to an optical finish such that it lies at 90° with respect to the optical axes of the bare optical fibers 414, 416.

The optical fiber 482 with the laser diode module 480 attached one end thereof is attached to the end face 412 such that it is optically coupled to the bare optical fiber 414 which is exposed on the end face 412. The optical fiber 420 is connected to the end face 412 such that one of the optical fiber 420 is optically coupled to the bare optical fiber 416 which is exposed on the end face 412.

Then, the fiber-embedded waveguide chip 400 and the optical waveguide substrate 300 are positioned and fixed with respect to each other such that the end faces 410, 314 extend substantially parallel to each other, and the bare optical fibers 414, 416 and the optical waveguides 306, 308 are optically coupled to each other.

Then, the optical fiber 390 for transmission and reception is attached to the end of the optical waveguide 306 at the end face 312 of the quartz substrate 302, thereby completing a bidirectional wavelength multiplexing transmission module 500.

FIG. 13 shows a bidirectional wavelength multiplexing transmission module according to a fifth embodiment of the present invention.

In the fourth embodiment above, the laser diode module 480 is optically coupled to the bare optical fiber 414 of the fiber-embedded waveguide chip 400 through the optical fiber 482. In the fifth embodiment, however, a laser diode module 470 is directly attached to the end face 412 of the fiber-embedded waveguide chip 400. The other details of the bidirectional wavelength multiplexing transmission module according to the fifth embodiment are the same as those of the bidirectional wavelength multiplexing transmission module according to the fourth embodiment. The bidirectional wavelength multiplexing transmission module according to the fifth embodiment is fabricated in the same manner as the bidirectional wavelength multiplexing transmission module according to the fourth embodiment. With the laser diode module 470 being directly attached to the end face 412 of the fiber-embedded waveguide chip 400, the bidirectional wavelength multiplexing transmission module may be reduced in size. Leads 472 extend from the laser diode module 470.

With the present invention, an end face of an optical waveguide substrate where an end of an optical waveguide is exposed is inclined with respect to the optical axis of the optical waveguide for causing a portion of light propagated through the optical waveguide to the end face to be reflected by the end face out of the optical waveguide substrate. Therefore, the length of a compound optical waveguide device may be shorter than a conventional device having an optical coupler composed of two fused optical fibers. A light-detecting device is disposed to detect light reflected from the inclined end face. Therefore, the light-detecting device is not disposed directly laterally of the optical waveguide substrate, but positioned three-dimensionally above or below the optical waveguide substrate. The overall length of the compound optical waveguide device may thus be reduced. Therefore, the compound optical waveguide device is small in size.

In another arrangement, a first end face of an optical waveguide substrate where an end of a first optical waveguide is exposed is inclined with respect to the optical axis of the first optical waveguide for causing a portion of light propagated through the first optical waveguide to the first end face to be reflected by the first end face out of the optical waveguide substrate. Therefore, the length of a compound optical waveguide device for use in an optical fiber gyro may be shorter than a conventional device having an optical coupler composed of two fused optical fibers. A light-detecting device is disposed to detect light reflected from the inclined first end face. Therefore, the light-detecting device is not disposed directly laterally of the optical waveguide substrate, but positioned three-dimensionally above or below the optical waveguide substrate. The overall length of the compound optical waveguide device for use in an optical fiber gyro may thus be reduced. Therefore, the compound optical waveguide device for use in an optical fiber gyro is small in size.

In still another arrangement, an end face of an optical waveguide substrate where an end of a first optical waveguide is exposed is inclined with respect to the optical axis of the first optical waveguide for causing a portion of light propagated through the first optical waveguide to the end face to be reflected by the end face out of the optical waveguide substrate. Therefore, the length of a bidirectional wavelength multiplexing transmission module may be reduced. A light-detecting device is disposed to detect light reflected from the inclined end face. Therefore, the light-detecting device is not disposed directly laterally of the optical waveguide substrate, but positioned three-dimensionally above or below the optical waveguide substrate. The overall length of the bidirectional wavelength multiplexing transmission module may thus be reduced. Therefore, the bidirectional wavelength multiplexing transmission module is small in size.

Although certain preferred embodiments of the present invention has been shown and described in detail, it should be understood that various changes and modifications may be made therein without departing from the scope of the appended claims.

What is claimed is:

1. A compound optical waveguide device comprising:
   an optical waveguide substrate having an optical waveguide and an end face at which an end of said optical waveguide is exposed, said end face being inclined at an angle with respect to an optical axis of said optical waveguide for causing a portion of light propagated through said optical waveguide to said end face to be reflected out of said optical waveguide substrate by said end face;
   a light-detecting device disposed for detecting the light reflected out of said optical waveguide substrate; and
   light supply means for supplying light to said optical waveguide, said light supply means comprising a light source and a further substrate having a further optical waveguide embedded therein, said further substrate having an end face at which an end of said further optical waveguide is exposed, said end face being inclined with respect to an optical axis of said further optical waveguide at an angle complementary to the angle of inclination of said optical waveguide substrate,
   wherein said optical waveguide substrate has a film made of dielectric or metal and disposed on said end face, whereby said portion of light propagated through said optical waveguide to said end face is reflected out of said optical waveguide substrate by at least one of an interface between said film and said end face and a surface of said film opposite to a surface thereof which is held in contact with said end face.

2. A compound optical waveguide device according to claim 1, wherein said optical waveguide substrate has at least one of a region for branching and coupling light propagated through said optical waveguide, a region for modulating light propagated through said optical waveguide, a region for splitting and combining light propagated through said optical waveguide, and a region for isolating light propagated through said optical waveguide.

3. A compound optical waveguide device according to claim 2, wherein said optical waveguide substrate has a film made of dielectric or metal and disposed on said end face, whereby said portion of light propagated through said optical waveguide to said end face can be reflected out of said optical waveguide substrate by at least one of an interface between said film and said end face and a surface of said film opposite to a surface thereof which is held in contact with said end face.

4. A compound optical waveguide device according to claim 3, wherein said light supply means comprises means for supplying light to said optical waveguide through said end face.

5. A compound optical waveguide device according to claim 2, wherein said light supply means comprises means for supplying light to said optical waveguide through said end face.

6. A compound optical waveguide device according to claim 1, wherein said light supply means comprises means for supplying light to said optical waveguide through said end face.

7. A compound optical waveguide device according to claim 1, wherein said light supply means comprises means for supplying light to said optical waveguide through said end face.

8. A compound optical waveguide device according to any one of claims 1 to 7, wherein said optical waveguide substrate comprises a substrate of $LiNbO_3$, a substrate of $LiTaO_3$, a substrate of glass, or a substrate of a semiconductor material.

9. A compound optical waveguide device for use in an optical fiber gyro, comprising:
  an optical waveguide substrate having a Y-shaped optical waveguide composed of a first optical waveguide and a pair of second and third optical waveguides branched from said first optical waveguide, a first end face at which an end of said first optical waveguide is exposed, a second end face at which ends of said second and third optical waveguides are exposed, and second end face being adapted to be connected to an optical fiber loop, and a phase modulator for modulating the phase of light propagated through at least one of said second and third optical waveguides, said first end face being inclined at an angle with respect to an optical axis of said first optical waveguide for causing a portion of light propagated through said first optical waveguide to said first end face to be reflected out of said optical waveguide substrate by said first end face;
  a light-detecting device disposed for detecting the light reflected out of said optical waveguide substrate; and
  light supply means for supplying light to said Y-shaped optical waveguide, said light supply means comprising a light source and a further substrate having a further optical waveguide embedded therein, said further substrate having an end face at which an end of said further optical waveguide is exposed, said end face being inclined with respect to an optical axis of said further optical waveguide at an angle complementary to the angle of inclination of said optical waveguide substrate.

10. A bidirectional wavelength multiplexing transmission module comprising:
  an optical waveguide substrate having a first optical waveguide, a second optical waveguide, an end face at which an end of said first optical waveguide is exposed, and a directional-coupler-type combiner/splitter for splitting and combining light propagated through said first optical waveguide and light propagated through said second optical waveguide, said end face being inclined at an angle with respect to an optical axis of said first optical waveguide for causing a portion of light propagated through said first optical waveguide to said end face to be reflected out of said optical waveguide substrate by said end face;
  a light-detecting device disposed for detecting the light reflected out of said optical waveguide substrate;
  light supply means for supplying light having a first wavelength to said first optical waveguide, said light supply means comprising a light source and a further substrate having a further optical waveguide embedded therein, said further substrate having an end face at which an end of said further optical waveguide is exposed, said end face being inclined with respect to an optical axis of said further optical waveguide at an angle complementary to the angle of inclination of said optical waveguide substrate; and
  means for passing light having a second wavelength different from said first wavelength through said second optical waveguide.

11. A compound optical waveguide device comprising:
  an optical waveguide substrate having an optical waveguide and an end face at which an end of said optical waveguide is exposed, said end face being inclined at an angle with respect to an optical axis of said optical waveguide for causing a portion of light propagated through said optical waveguide to said end face to be reflected out of said optical waveguide substrate by said end face;
  a light-detecting device disposed for detecting the light reflected out of said optical waveguide substrate; and
  light supply means for supplying light to said optical waveguide, said light supply means comprising a light source and a further substrate having a further optical waveguide embedded therein, said further substrate having an end face at which an end of said further optical waveguide is exposed, said end face being inclined with respect to an optical axis of said further optical waveguide at an angle complementary to the angle of inclination of said optical waveguide substrate,
  wherein said optical waveguide substrate comprises a substrate of $LiNbO_3$, a substrate of $LiTaO_3$, or a substrate of glass.

* * * * *